United States Patent [19]

Sanclemente

[11] 4,260,583
[45] Apr. 7, 1981

[54] REDUCTION OF DEPOSITS IN CARBON BLACK REACTORS

[75] Inventor: Amaury Sanclemente, Cali, Colombia

[73] Assignee: Phillips Petroleum Company, Bartlesville, Okla.

[21] Appl. No.: 675,001

[22] Filed: Apr. 8, 1976

Related U.S. Application Data

[62] Division of Ser. No. 533,449, Dec. 16, 1974, Pat. No. 3,972,985.

[51] Int. Cl.³ .............................................. C09C 1/48
[52] U.S. Cl. .................................... 422/151; 250/528; 423/450; 431/2; 204/188; 422/150; 422/156
[58] Field of Search ....... 23/259.5; 423/450, 455–458, 423/454, 461; 431/2, 8; 250/528–530; 422/150, 151, 156; 204/184, 186, 188

[56] References Cited

U.S. PATENT DOCUMENTS

| 2,564,700 | 8/1951 | Krejci | 423/456 |
| 2,852,346 | 9/1958 | Austin | 423/454 |
| 2,870,081 | 1/1959 | Frey | 204/184 X |
| 2,890,746 | 6/1959 | Dollinger | 423/450 X |
| 2,961,300 | 11/1960 | Dollinger | 23/259.5 X |
| 3,035,412 | 5/1962 | Poujade | 431/2 X |
| 3,223,605 | 12/1965 | Ruble et al. | 423/458 |
| 3,448,052 | 6/1969 | Otto | 423/450 X |
| 3,585,122 | 6/1971 | King | 204/186 X |

FOREIGN PATENT DOCUMENTS 16299 3/1968 Colombia.

Primary Examiner—Frank W. Lutter
Assistant Examiner—Roger F. Phillips

[57] ABSTRACT

Deposits in a carbon black reactor are reduced by passing feed oil, quench water and/or liquid fuel to the reactor through a magnetic field prior to introduction into the reactor.

6 Claims, 3 Drawing Figures

REDUCTION OF DEPOSITS IN CARBON BLACK REACTORS

This application is a division of copending application Ser. No. 533,449, filed Dec. 16, 1974, now U.S. Pat. No. 3,972,985.

It is common practice to produce carbon black by furnace processes wherein a fuel oil is heated in a reactor to an elevated temperature to decompose the oil to produce carbon black. Heat to raise the temperature of the oil is normally supplied by introducing combustion gases into the reactor to surround the feed oil stream. The reaction is often quenched by introducing a stream of water into the downstream region of the reactor. Because of the high temperatures involved, the reactors are usually constructed of or lined with ceramic materials.

Deposits often form on the reactor lining and thereby limit the useful operating life of the reactor. When the deposits become excessive, it is necessary to shut down the reactor and physically remove the deposits from the lining. This is an expensive and time-consuming operation because the reactors must gradually be cooled, opened, cleaned, rebuilt and then gradually heated back to the operating temperature.

In accordance with this invention, it has been found that deposits in carbon black furnaces can be reduced substantially by passing the feed oil, quench water and/or liquid fuel through a magnetic field prior to introduction into the reactor.

In the accompanying drawing.

Figure 1:
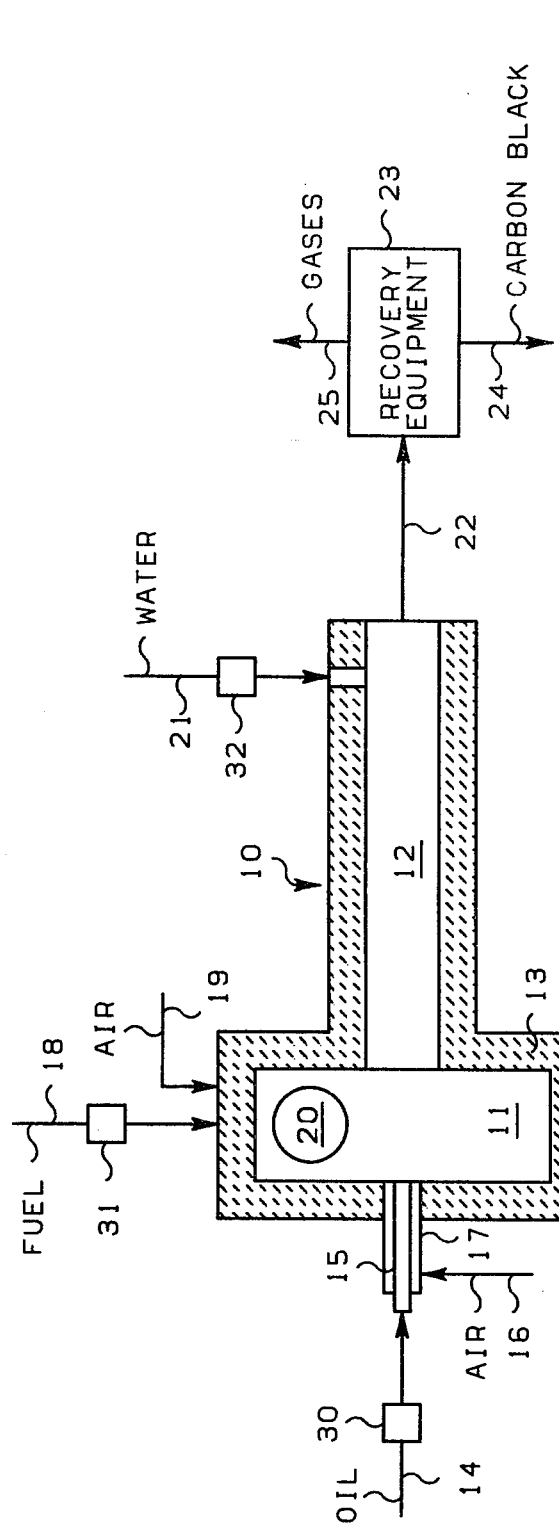
FIG. 1 is a schematic representation of carbon black-producing equipment having apparatus of this invention incorporated therein.

Referring now to the drawing in detail and to FIG. 1 in particular, there is shown a typical carbon black-producing system which comprises a furnace 10 having a cylindrical precombustion section 11 and a cylindrical reaction section 12. The furnace is formed of or lined with a ceramic refractory material 13. In order to simplify the drawing, the entire furnace is shown as being constructed of such material. However, in actual practice, furnaces are usually constructed of one or more layers of ceramic material enclosed within a metal shell.

A feed oil is introduced through a conduit 14 which communicates with an inlet tube 15 which extends axially into precombustion zone 11. A stream of air can be introduced through a conduit 16 which communicates with a tube 17 that surrounds feed oil tube 15. Fuel and air are introduced through respective conduits 18 and 19 which communicate with a burner, not shown, located either externally or within a tunnel 20 which enters precombustion zone 11 in a direction generally tangential to the side wall of this section. Two of these tunnels 180 degrees apart normally are provided. Quench water is introduced through a conduit 21 which communicates with reaction section 12 at a downstream region thereof. The effluent from the furnace is directed by conduit 22 to recovery equipment 23 from which carbon black 24 and a stream of offgases 25 are removed.

The apparatus thus far described constitutes one embodiment of a conventional carbon black reactor. Such a reactor and its operation are described in greater detail in U.S. Pat. Nos. 2,564,700 and 2,961,300, for example, the disclosures of which are herein incorporated by reference.

Figure 3:
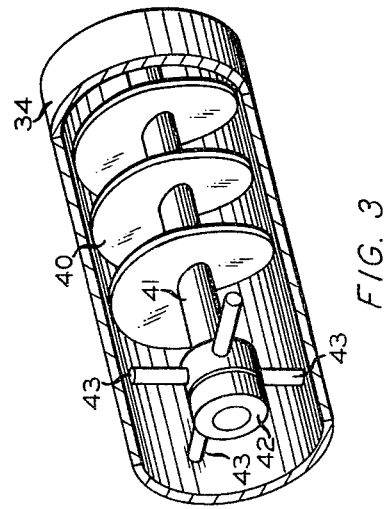
FIG. 3 illustrates a rotating element positioned within the apparatus of FIG. 2.
Figure 2:
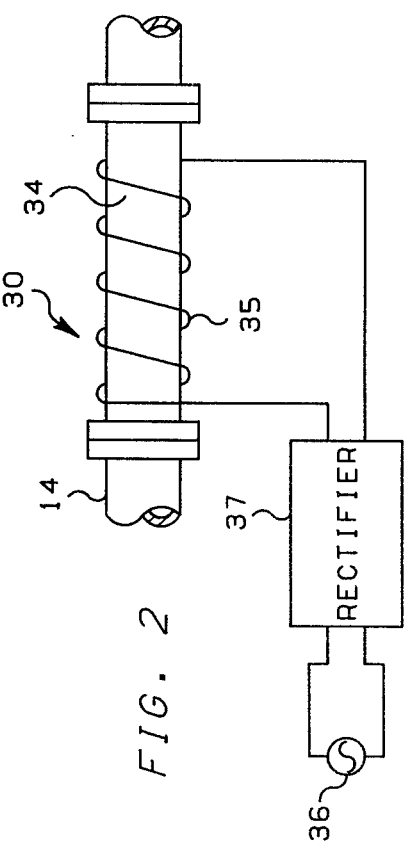
FIG. 2 is a schematic representation of apparatus employed to establish magnetic fields.

In accordance with one embodiment of this invention, the feed oil, fuel and water introduced into reactor 10 are passed through magnetic fields. These fields can be established by elements 30, 31 and 32 which are connected to respective conduits 14, 18 and 21. One such element 30 is illustrated schematically in FIG. 2. A conduit 34 of magnetizable material, such as carbon steel, is mounted in conduit 14. A coil 35 is wound on conduit 34. An alternating current source 36 is connected to the input of a rectifier 37, the output of which is connected across coil 35. In this manner, direct current flows through coil 35 to magnetize conduit 34 and thereby establish a magnetic field through which the feed oil flows. This magnetic field should have a strength of at least 10 oersteds. As illustrated in FIG. 3, a rotatable helical element 40 is positioned within conduit 34. Element 40 is attached to a shaft 41 which is free to rotate in a hub 42. Hub 42 is secured to the inner wall of conduit 34 by radial arms 43. The flow of fluid through conduit 34 tends to rotate element 40 to impart a swirl to the fluid. Elements 31 and 32 can be of the same configuration as element 30. Although the use of a coil 35 is convenient to establish the magnetic field, other means such as permanent magnets and electromagnets of other configurations can also be employed.

In the illustrated embodiment of this invention, a liquid fuel is supplied through conduit 18. In the event that a gaseous fuel, such as natural gas, is employed, element 31 is not employed. While elements 30, 31 and 32 are employed in the preferred embodiment, improved results can be obtained with even one of these elements.

In one specific embodiment of this invention, a furnace of the type illustrated in FIG. 1 with two tangential tunnels was employed to produce carbon black. The hydrocarbon feed oil introduced through conduit 14 had an API Gravity (60° F.) of 2.5, an initial boiling point of 550° F., a 50% point of 887° F., a 90% point of 1065° F., and a BMCI of 108. This oil was introduced at the rate of 240 gallons per hour. The hydrocarbon fuel oil introduced through conduit 18 had an API gravity (60° F.) of 12.6, an initial boiling point of 520° F., and a 50% point of 1000° F., at which point cracking started. This fuel oil was introduced at the rate of 80 gallons per hour. Air was introduced through conduits 16 and 19 at rates of 2.446 and 199 MSCF/hr., respectively. Quench water was introduced through conduit 21 at the rate of 36 gallons per hour. The liquid streams contained the following elements (parts per million by weight), present as oxides, hydroxides, salts and/or organocompounds:

|  | Feed Oil | Fuel Oil | Quench Water |
|---|---|---|---|
| Silicon | 77 | 16 | — |
| Aluminum | 37 | 17 | — |
| Iron | 71 | 17 | — |
| Sodium | 4.5 | 59 | — |
| Calcium | 15 | 41 | 4.6 |
| Magnesium | — | — | 62 |

Prior to the installation of elements 30, 31 and 32, it was necessary to shut the reactor down and clean out deposits every two to three months. After installation of elements 30, 31 and 32, the reactor was operated over nine months without a shutdown and cleanup. Elements 30, 31 and 32 were Demit units sold by Demit-Vazcruz, Carrera 1a. No. 30-14, Cali Valle Colombia, and described in Colombian Pat. No. 16299. As described in this patent, element 40 is constructed of magnetizable material so as to be magnetized, as is conduit 34. Approximately 50 volts D.C. was applied across the coils.

While this invention has been described in conjunction with a tangential type carbon black furnace of the type described in U.S. Pat. Nos. 2,564,700 and 2,961,300, it can be employed in conjunction with other carbon black furnace reactors, such as described in U.S. Pat. Nos. 2,375,797, 3,355,247 and 3,490,869, for example.

While the invention has been described in conjunction with presently preferred embodiments, it obviously is not limited thereto.

What is claimed is:

1. In a system for producing carbon black in a reactor wherein a feed oil is introduced into the reactor through first conduit means, and heat is supplied to the reactor to elevate the temperature of the feed oil to decompose the oil to produce carbon black; apparatus to reduce deposits in the reactor comprising a first conduit of magnetizable material forming a section of said first conduit means, a rotatable element of magnetizable material positioned within said first conduit to impart a swirl to feed oil passed therethrough, a first coil enclosing said first conduit so that passage of direct current therethrough establishes a first magnetic field through which the feed oil passes, and means connected to said first coil to pass a direct current therethrough of such magnitude that said first magnetic field is at least 10 oersteds.

2. The system of claim 1 wherein a quench liquid is introduced into the reactor through second conduit means; and further comprising a second conduit of magnetizable material forming a section of said second conduit means, a rotatable element of magnetizable material positioned within said second conduit to impart a swirl to quench liquid passed therethrough, a second coil enclosing said second conduit so that passage of direct current therethrough establishes a second magnetic field through which the quench liquid passes, and means connected to said second coil to pass a direct current therethrough of such magnitude that said second magnetic field is at least 10 oersteds.

3. The system of claim 2 wherein the heat is supplied by burning a liquid fuel which is introduced through a third conduit means; and further comprising a third conduit of magnetizable material forming a section of said third conduit means, a rotatable element of magnetizable material positioned within said third conduit to impart a swirl to liquid fuel passed therethrough, a third coil enclosing said third conduit so that passage of direct current therethrough establishes a third magnetic field through which the liquid fuel passes, and means connected to said third coil to pass a direct current therethrough of such magnitude that said magnetic field is at least 10 oersteds.

4. In a system for producing carbon black in a reactor wherein a feed oil is introduced into the reactor through first conduit means, and a quench liquid is introduced into the reactor through second conduit means; apparatus to reduce deposits in the reactor comprising a first conduit of magnetizable material forming a section of said second conduit means, a rotatable element of magnetizable material positioned within said first conduit to impart a swirl to quench liquid passed therethrough, a first coil enclosing said first conduit so that passage of direct current therethrough establishes a magnetic field through which the quench liquid passes, and means connected to said first coil to pass a direct current therethrough of such magnitude that said magnetic field is at least 10 oersteds.

5. The system of claim 4 wherein heat is supplied to the reactor by burning a liquid fuel which is introduced through a third conduit means; and further comprising a second conduit of magnetizable material forming a section of said third conduit means, a rotatable element of magnetizable material positioned within said second conduit to impart a swirl to liquid fuel passed therethrough, a second coil enclosing said second conduit so that passage of direct current therethrough establishes a second magnetic field through which the liquid fuel passes, and means connected to said second coil to pass a direct current therethrough of such magnitude that said second magnetic field is at least 10 oersteds.

6. In a system for producing carbon black in a reactor wherein a feed oil is introduced into the reactor through first conduit means, and heat is supplied to the reactor to elevate the temperature of the feed oil to decompose the oil to produce carbon black, said heat being supplied by burning a liquid fuel which is introduced through a second conduit means; apparatus to reduce deposits in the reactor comprising a conduit of magnetizable material forming a section of said second conduit means, a rotatable element of magnetizable material positioned within said conduit to impart a swirl to liquid fuel passed therethrough, a coil enclosing said conduit so that passage of direct current therethrough establishes a magnetic field through which the liquid fuel passes, and means connected to said coil to pass a direct current therethrough of such magnitude that said magnetic field is at least 10 oersteds.

* * * * *